Nov. 5, 1935.  H. M. J. DE MERIC DE BELLEFON ET AL  2,020,109
PRESERVATION OF FISH BY COLD STORAGE
Filed Jan. 14, 1933
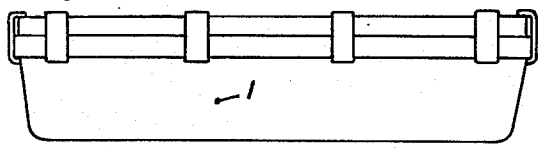
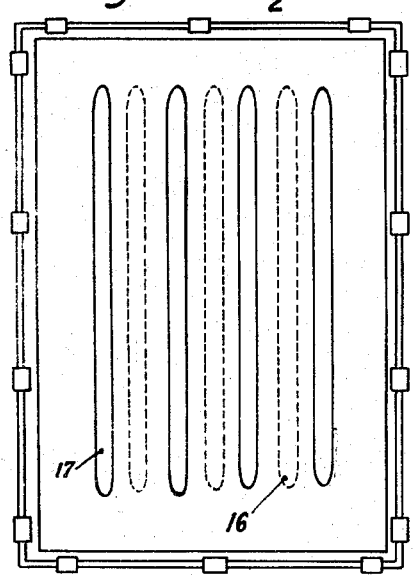
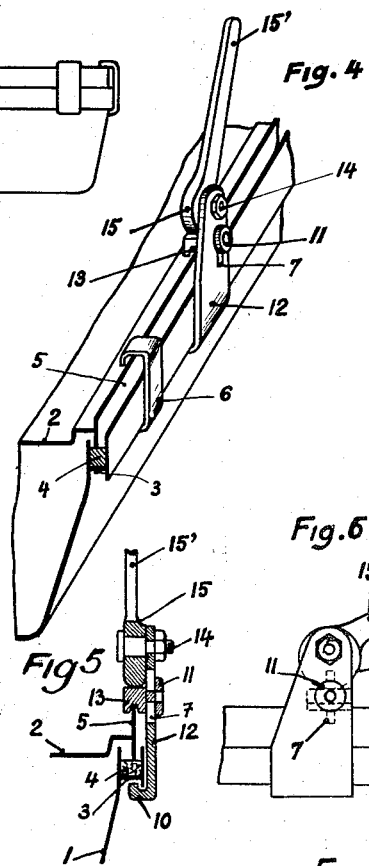
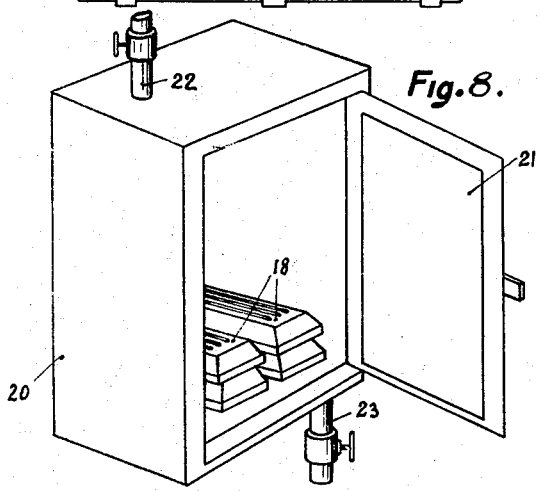
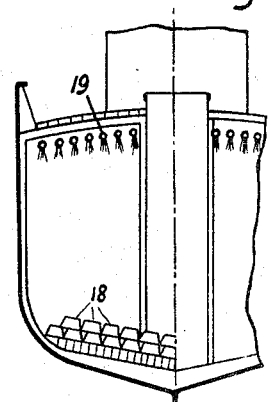
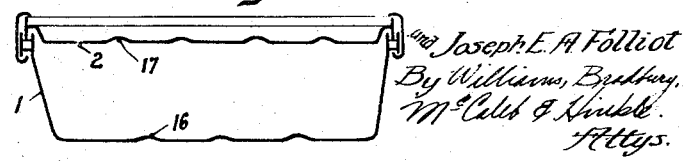

Patented Nov. 5, 1935

2,020,109

UNITED STATES PATENT OFFICE 2,020,109

PRESERVATION OF FISH BY COLD STORAGE

Hugues Marie Jacques de Meric de Bellefon and Joseph Ernest Alexandre Folliot, La Rochelle, France, assignors to Société René Maubaillarcq & Cie., La Rochelle, France, a corporation of France Application January 14, 1933, Serial No. 651,828
In Germany December 16, 1932

8 Claims. (Cl. 99—14)

This invention relates to the preservation of fish by means of cold storage, and has for its main object to enable the fish to retain, for at least a month, the qualities and appearance of fresh fish.

Processes at present in use for preserving fish by means of cold storage are of two principal kinds known by the names of "chilling" and "freezing". In the first mentioned process, the freshly caught fish are placed upon a substratum of crushed fresh water ice and are covered with a layer of the same substance, several layers of fish thus covered being superimposed. The fish retain for about fifteen days their comestible qualities and a comparatively fresh appearance, but the lower layers are contaminated owing to the percolation through them of the polluted water produced by a portion of the ice melting, due, in the first place to the heat of the fish the temperature of which is +10° C. (on an average) when put into the ice, and subsequently to the absorption of heat from outside.

To overcome the disadvantages of this process of preserving the fish various methods of freezing the fish have been proposed, consisting in immersing the fish in a brine, generally very cold, e. g. at —20° C. or lower, in order to obtain as rapid freezing as possible, which rapidity is recognized at the present day to be indispensable if the fish treated by these methods are to be preserved satisfactorily. When the fish are frozen, they are withdrawn from the brine, covered with a layer of ice and stored in a refrigerating chamber at —15° C., or preferably at an even lower temperature.

With these methods the fish are always in contact with the brine so that more or less extensive exchanges of liquids take place by osmosis between the brine and the cellular tissues of the fish. Further, the brine, notwithstanding the provision of more or less complicated purifying apparatus, ultimately becomes slightly contaminated.

Consequently, the fish always have an appearance which is different from that of fresh fish, the eyes are white, and the gills always change when the fish is thawed out, so that the market value of the fish is very considerably reduced.

Furthermore, the low temperatures necessarily require powerful machinery the operation of which entails expense, and finally the fish preserved in this way suffer a considerable loss in weight due to evaporation.

The object of the present invention is to overcome these disadvantages and to provide a process for the preservation of the fish in a more efficacious and less costly manner than is possible by the methods above described and by which the fish will retain for at least one month the qualities and appearance of fresh fish.

The process of preserving fish according to the invention is characterized by the fact that the fish are placed, immediately after they have been caught, and without having undergone any preliminary treatment, except perhaps that of being eviscerated through the gills, into boxes, preferably disinfected metal boxes which hold, for example, about 50 kg. After they have been filled these boxes are closed in such a way as to exclude air and water and they are subjected to a freezing treatment which rapidly, e. g. in about twelve hours, brings their contents down to a temperature of about —2° to —3° C. without causing them to freeze and they are kept at a temperature of from —2° to —3° C. approximately, up to the time of delivery.

For boxing, the fish, sorted into categories, are arranged without being compressed in superimposed layers until the box is completely filled. Haddock, cod, and other non-flat fish may, with advantage be eviscerated before being placed in the box, the eviscerating being performed through the gills and the latter are not removed.

Experience has shown that preservation of the fish at this moderate temperature of —2°, —3° C. with the exclusion of the outer air, carried out according to the method above described, is very efficacious. It will be noted that there is no evaporation and that the fish thus treated never cause any trickling down of water produced by the melting ice as is the case with fish preserved simply in ice by the usual method, and as would occur in the hermetically sealed boxes also if the cooling were not sufficiently rapid and if the temperature at which the fish is stored was nearer 0° C. The rapid cooling of the fish to —2° to —3° C. and the consolidation of the skins which results therefrom have therefore prevented any trickling. At the end of thirty days, the fish when taken from the boxes are still perfect in appearance. The eyes are clear, the gills have not undergone any alteration and the skin has retained all its brightness. Furthermore, the fish do not form a solid mass in the boxes and come apart easily from one another in the hand. When taken from the boxes the fish have all the qualities of appearance and flavour of fresh fish, and, moreover, they have not suffered any loss in weight since they were caught.

The hermetically sealed boxes may also be used with advantage at the temperatures herein given to preserve under favourable conditions on land fish which have been recently caught, whether or not packed in ice.

It would seem that the excellent preservation obtained when the fish are immediately placed in a watertight and airtight box cooled down to about —2° to —3° C. may be explained in the following manner. The oxygen of the air contained in the box when it is closed is absorbed by the still living cells of the freshly caught fish and these cells evolve carbonic acid gas which forms an inert atmosphere in which the tissues are preserved without any change in their fresh state owing to being cooled down to —2° to —3° C.

If the fish preserved for a certain time, for example fifteen to twenty days, on board the trawler at about —2° to —3° C. are not intended to be consumed immediately on their arrival in port, their preservation can be considerably prolonged by subjecting the boxes with their contents to a process of freezing at —15° to —20° C. for example, and immediately before delivering them for consumption, by allowing them to remain for about forty-eight hours in a chamber at about —2° to —3° C.

For this freezing process, the boxes are subjected to the action of a brine at a very low temperature, e. g., chloride of calcium the cryohydratic point of which is —55° C. for a concentration of 39° Beaumé, and which, as a consequence, cannot be used when the cold liquid is brought into direct contact with the fish. It is therefore possible, with the method according to this invention to lower the temperature of the freezing bath below that used in the processes known as the "direct contact" processes, and to obtain in consequence a more rapid freezing while yet retaining the advantages attendant on the absence of contact between the fish and liquid or atmosphere.

This freezing, following on simple refrigeration, will be more frequently carried out on land, after the discharge of the cargo, when, for any reason, rapid sale of the refrigerated fish is not contemplated. The transhipment of the boxes between the ship and the refrigerating plant can be effected without difficulty, and their contents will not have to undergo any handling which would bruise or damage them. The boxes frozen internally will then be kept in a refrigerating chamber. Under these conditions, the almost indefinite preservation of the fish can be ensured without it having been necessary to provide a cumbrous and costly plant on board the vessels.

The boxes of fish frozen at a low temperature must be stored, before being opened, for at least forty-eight hours in a refrigerating chamber at —2° to —3° C. This storage is sufficient to allow of the fish which had become agglomerated during the freezing, being readily separated by hand when the boxes are opened. The appearance of the fish is perfect, the eyes are clear and the gills are perfectly red.

In order to bring the contents of the boxes rapidly to a temperature of about —2° to —3° C. on board the trawler it is advantageous to subject them, immediately after they have been closed, to the action of a cold brine, either by spraying or immersion, but, in order to prevent the fish from being frozen, a brine will be used the temperature of which is not lower than about —6° C., and the boxes will be only left in it long enough to bring their contents down to about 0° C.

The boxes will then be stored in cold holds wherein they will be maintained at a temperature which will keep the contents at about —2° to —3° C., if they have not been treated directly by spraying them with unfreezable liquids, at their storage plant.

Reference will now be had to the accompanying drawing which illustrates the invention by way of example and in which,—

Figs. 1 to 6 show the hermetically sealed box,
Fig. 1 is a schematic view illustrating the clamping means,
Fig. 2 a side elevation,
Fig. 3 a plan view,
Fig. 4 a perspective detail view showing the special vise with locking member, and
Fig. 5 a transverse section of the vise and locking member.
Fig. 6 a front view of the vise and locking member,
Fig. 7 is a diagrammatic sectional representation of the installation in a ship's hold.
Fig. 8 is a perspective view of a vat or chest for the immersion of the boxes.

Referring first to Figs. 1 to 5, the boxes intended to receive the fish immediately after they are caught are made of galvanized sheet metal or of any other material which will not be attacked by sea water, and will be capable of being disinfected between successive uses. The capacity is variable according to the nature of the fish caught. It will always be well to use boxes of a moderate capacity, containing say not more than fifty kilos of fish, so as to favour the rapid penetration of the cold to the fish situated at the centre of the boxes, and to facilitate handling.

Each box includes a bottom or body portion 1 and a cover 2. The bottom 1 is in the form of a truncated pyramid, which has the advantage, when the boxes are empty, of permitting the boxes to be nested so that they occupy less space, while the covers which are practically flat, may likewise be piled together into a small space.

The upper marginal edge of the bottom or body portion 1 is provided externally with a gutter 3, partially filled by a thick ring of soft rubber 4. The cover 2 is provided externally with a thin vertical flange 5, which enters the gutter 3 and bears against the centre of the jointing ring 4. The thickness of the jointing ring 4 and the depth of the lower part of the cover flange 5 are such that when they are in contact with each other the distance between the upper and lower edges of the joint is also considerably greater than the height of the clamps 6 which serve to connect them. It follows that this connection can only be made after the cover has been jammed down tightly on to the bottom, in such a way as to make the lower thin edge of the flange 5 enter the upper surface of the jointing ring 4 at the point where the clamp is to be placed. For this purpose, the vise shown in Figs. 4 and 5 will be used. This vise is constituted by a flat plate 12 flanged at 10 and having a slot 7 in which a member 13 acting as the movable jaw of the vise slides freely. The jaw 13 is held in place by a washer 11 riveted to a cylindrical extension of the square section which slides in the groove 7. The upper part of the plate 12 is apertured to receive without any clearance a pin 14 which is held in place by a nut. This pin 14 carries an eccentric cam 15 which terminates in a lever 15' of appropriate length. The rotation of the cam 15 on the pin 14 causes the upper and lower ends of the joint to be brought together and permits of the clamps 6 being placed in position very easily.

The lower face of the bottom 1 is provided with grooves 16, while the cover is provided with ribs 17 which are staggered relatively to the grooves 16 in the bottom. The object of these grooves and ribs is firstly to provide the rigidity of the upper and lower faces of the box and, secondly, when the full boxes are closed and piled one on the other, to leave a certain free space between two boxes for the circulation of the air and/or refrigerating liquid.

In Fig. 6, the closed boxes 18 are shown one above the other in the cold hold of the trawler. In the upper part of the hold pipes 19 are arranged by which the boxes are sprayed as they are piled into the hold and while they remain there, with cold brine which is atomized into a mist or spray.

As aforementioned, it is desirable that the fish, which are placed in the boxes immediately after they have been caught, should be brought as rapidly as possible to the temperature of −2° to −3° C. at which they are to be preserved. To this end the hermetically sealed boxes may be first stored temporarily in a vat of colder brine, care being taken, however, that the temperature of this brine and the time of immersion shall not be sufficient for the fish to become frozen in the interior of the boxes.

Fig. 7 shows a suitable vat in the form of a chest provided with a hermetically sealed door, which facilitates the handling of the boxes when passing them into the brine. This chest comprises a casing 20 provided on one of its larger sides with a hermetically sealed door 21, at its upper end with a supply pipe 22 for the brine, and at its lower end with an outlet pipe 23 for the brine. When the chest is filled with boxes, the cold brine is circulated through the chest by the pipes 22 and 23, for the required time so as to bring the contents of the boxes to about 0° C. which time is variable according to the temperature of the fish when placed in the boxes. On the desired temperature being attained, the brine is run out of the chest 20, the door 21 is opened and the boxes 18 are removed and returned to the hold.

What we claim is:—

1. A process for the preservation of fish by cold storage consisting in placing the fish in containers, hermetically sealing the containers and subjecting them to a refrigerating treatment which brings the contents to a temperature below 0° C. but does not freeze them.

2. A process for the preservation of fish by cold storage consisting in placing the fish in disinfected containers, hermetically sealing the containers and immediately subjecting the containers to refrigeration for from 4 to 7 hours with brine at a temperature not lower than −6° C., such that the fish in the containers are brought to a temperature below 0° C. without being frozen.

3. A process of preserving fish by cold storage consisting in placing the fish in disinfected containers, hermetically sealing the containers, subjecting the containers to a refrigerating treatment such that the fish therein are brought to a temperature below 0° C. without being frozen, subsequently freezing the fish by subjecting the containers to a lower temperature, and, prior to opening the containers, maintaining them for a considerable period at about 0° C.

4. A process for the preservation of fish by cold storage on ships, comprising placing the fish in containers, hermetically sealing the containers, superimposing said containers upon one another in a refrigerating chamber in the ship's hold, and spraying a cooled brine solution over said containers while in said chamber to subject the fish to a temperature below 0° C. without freezing them.

5. A process for the preservation of fish by cold storage on ships, comprising placing the fish in containers, hermetically sealing the containers, superimposing said containers upon one another in a refrigerating chamber of the ship's hold, spraying a cooled brine solution over said containers while in said chamber to subject the fish to a temperature below 0° C. without freezing them, subsequently spraying over said containers a cooled brine solution of lower temperature than the first to freeze the fish, and prior to opening said containers spraying a cooled brine solution over said containers to subject the fish to a temperature of about 0° C.

6. A process for the preservation of fish by cold storage on ships, comprising utilizing containers having means for spacing said containers in a manner to permit free circulation of liquid or air around each container when said containers are superimposed upon one another, placing the fish in said containers, hermetically sealing the containers, superimposing said containers upon one another in a refrigerating chamber in the ship's hold, and spraying a cooled brine solution over said containers while in said chamber to subject the fish to a temperature below 0° C. without freezing them.

7. A process for the preservation of fish by cold storage on ships, comprising utilizing containers having means for spacing said containers in a manner to permit free circulation of liquid or air around each container when said containers are superimposed upon one another, placing the fish in said containers, hermetically sealing the containers, superimposing said containers upon one another in a refrigerating chamber in the ship's hold, spraying a cooled brine solution over said containers while in said chamber to subject the fish to a temperature below 0° C. but not sufficient to freeze them, subsequently freezing said fish by subjecting said containers to a lower temperature, and prior to opening said containers subjecting said containers to a temperature of about 0° C.

8. A process for the preservation of fish by cold storage consisting in placing the fish in disinfected containers, hermetically sealing the containers and subjecting them to a refrigerating treatment which brings the content to a temperature of about −2° C. to −3° C.

HUGUES MARIE JACQUES DE
      MERIC DE BELLEFON.
JOSEPH ERNEST ALEXANDRE FOLLIOT.